(12) United States Patent
Wang et al.

(10) Patent No.: US 12,678,692 B2
(45) Date of Patent: Jul. 14, 2026

(54) TARGET OPERATION BATCH EXECUTION METHOD AND APPARATUS, STORAGE MEDIUM, AND ELECTRONIC DEVICE

(71) Applicant: Tencent Technology (Shenzhen) Company Limited, Shenzhen (CN)

(72) Inventors: Chuhui Wang, Shenzhen (CN); Weixiang Yu, Shenzhen (CN); Yun Yang, Shenzhen (CN); Wenyi Li, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 173 days.

(21) Appl. No.: 18/751,103

(22) Filed: Jun. 21, 2024

(65) Prior Publication Data

US 2024/0342601 A1    Oct. 17, 2024

Related U.S. Application Data

(63) Continuation of application No. PCT/CN2023/117308, filed on Sep. 6, 2023.

(30) Foreign Application Priority Data

Sep. 27, 2022    (CN) .......................... 202211182995.9

(51) Int. Cl.
*A63F 13/52* (2014.01)
*A63F 13/533* (2014.01)
(Continued)

(52) U.S. Cl.
CPC ............ *A63F 13/533* (2014.09); *A63F 13/52* (2014.09); *A63F 13/5372* (2014.09);
(Continued)

(58) Field of Classification Search
CPC .... A63F 13/533; A63F 13/52; A63F 13/5372; A63F 13/822; A63F 13/55; G06F 30/13;
(Continued)

(56) References Cited

U.S. PATENT DOCUMENTS

| | | | |
|---|---|---|---|
| 6,764,401 B1 * | 7/2004 | Akatsuka | ................ A63F 13/22 463/43 |
| 7,277,572 B2 * | 10/2007 | MacInnes | ............ G06Q 10/103 382/284 |

(Continued)

FOREIGN PATENT DOCUMENTS

| | | | |
|---|---|---|---|
| CN | 111176527 A | 5/2020 | |
| CN | 111589151 A * | 8/2020 | ........... A63F 13/577 |

OTHER PUBLICATIONS

International Search Report and Written Opinion received for PCT Patent Application No. PCT/CN2023/117308, mailed on Nov. 10, 2023, 14 pages (7 pages of English Translation and 7 pages of Original Document).

(Continued)

*Primary Examiner* — Grant Sitta

(74) *Attorney, Agent, or Firm* — ARENTFOX SCHIFF LLP

(57) ABSTRACT

In a method for a target operation, a target virtual character is displayed in a game scene. The game scene includes a group of virtual objects and each virtual object in the group of virtual objects is available for the target virtual character to perform a target operation. A batch option is displayed when the target operation is selected by the target virtual character for a subset of the group of virtual objects and a number of the subset of the group of virtual objects is greater than or equal to a preset threshold. A batch target operation is performed based on a trigger operation on the batch (Continued)

option. The batch option is configured to perform the batch target operation on the group of virtual objects.

20 Claims, 13 Drawing Sheets

(51) Int. Cl.

| | |
|---|---|
| *A63F 13/5372* | (2014.01) |
| *G06F 30/13* | (2020.01) |
| *G06F 111/16* | (2020.01) |
| *G06Q 50/08* | (2012.01) |
| *G06Q 50/16* | (2024.01) |
| *G06T 15/04* | (2011.01) |
| *G06T 15/20* | (2011.01) |

(52) U.S. Cl.
CPC ............. *G06F 30/13* (2020.01); *G06Q 50/08* (2013.01); *G06T 15/04* (2013.01); *G06F 2111/16* (2020.01); *G06Q 50/16* (2013.01); *G06T 15/20* (2013.01)

(58) Field of Classification Search
CPC .... G06F 2111/16; G06Q 50/08; G06Q 50/16; G06T 15/04; G06T 15/20

See application file for complete search history.

(56) References Cited

U.S. PATENT DOCUMENTS

| | | | | |
|---|---|---|---|---|
| 7,877,237 | B1 * | 1/2011 | Saebi ...................... | G06F 30/13 |
| | | | | 703/1 |
| 8,510,672 | B2 * | 8/2013 | Loberg .................... | G06F 3/048 |
| | | | | 715/765 |
| 10,049,493 | B1 * | 8/2018 | Verizzo ................... | G06T 17/20 |
| 10,984,493 | B1 * | 4/2021 | Borchardt ........... | G06Q 50/165 |
| 11,281,437 | B2 * | 3/2022 | Millington ............... | G06F 8/20 |
| 11,341,730 | B2 * | 5/2022 | Cappiello ............. | G06T 19/006 |
| 11,410,373 | B2 * | 8/2022 | Cappiello ............. | G06Q 50/08 |
| 11,610,365 | B2 * | 3/2023 | Jagannathan ....... | G06F 16/9535 |
| 11,977,821 | B1 * | 5/2024 | Marsh ...................... | G06F 30/13 |
| 11,998,846 | B2 * | 6/2024 | Otomo ................... | A63F 13/58 |
| 2010/0208285 | A1 * | 8/2010 | Takeya .................. | G06F 3/1255 |
| | | | | 358/1.13 |
| 2017/0095737 | A1 * | 4/2017 | Nishikawa .............. | A63F 13/35 |
| 2018/0217739 | A1 * | 8/2018 | Jain ..................... | G06F 3/04845 |
| 2019/0242692 | A1 * | 8/2019 | Saure ................... | G01C 15/002 |
| 2020/0113650 | A1 * | 4/2020 | Lemchen .............. | G16H 10/60 |
| 2021/0063039 | A1 * | 3/2021 | Hallendy ................ | F24F 11/46 |
| 2021/0291054 | A1 * | 9/2021 | Tian .................... | G06F 3/04817 |
| 2023/0019216 | A1 * | 1/2023 | Liu .................... | H04N 21/4781 |

OTHER PUBLICATIONS

Lin Bei is Qing Tongtong, "[Yimengjianghu] Residence Decoration Single Product "Blue Wag Pavilion" Tutorial", Available online at: <https://www.bilibili.com/video/BV1nC4y1x7fp/?p=2&spm_id_from=pageDriver>, Apr. 9, 2020, 11 pages (Official copy only).
Office Action received for Chinese Patent Application No. 202211182995.9, mailed on Mar. 3, 2026, 16 pages (9 pages of English Translation and 7 pages of Original Office Action).

* cited by examiner

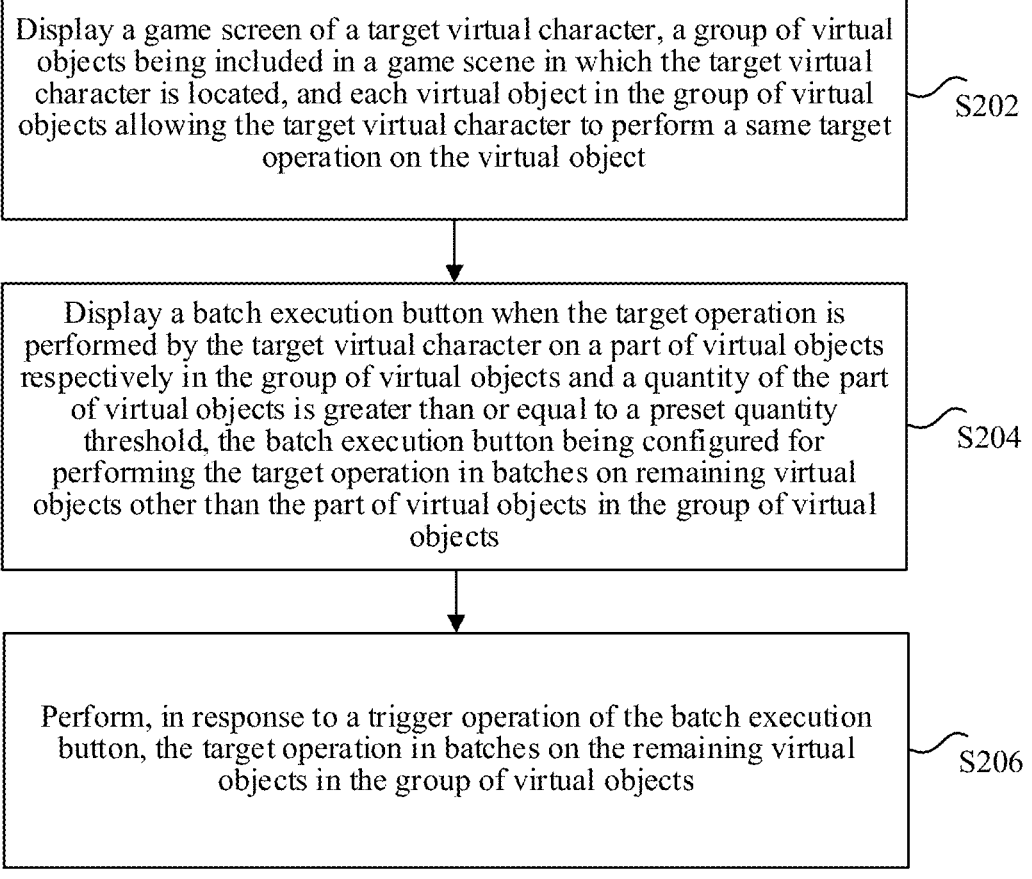

Display a game screen of a target virtual character, a group of virtual objects being included in a game scene in which the target virtual character is located, and each virtual object in the group of virtual objects allowing the target virtual character to perform a same target operation on the virtual object ⟋S202

Display a batch execution button when the target operation is performed by the target virtual character on a part of virtual objects respectively in the group of virtual objects and a quantity of the part of virtual objects is greater than or equal to a preset quantity threshold, the batch execution button being configured for performing the target operation in batches on remaining virtual objects other than the part of virtual objects in the group of virtual objects ⟋S204

Perform, in response to a trigger operation of the batch execution button, the target operation in batches on the remaining virtual objects in the group of virtual objects ⟋S206

FIG. 2

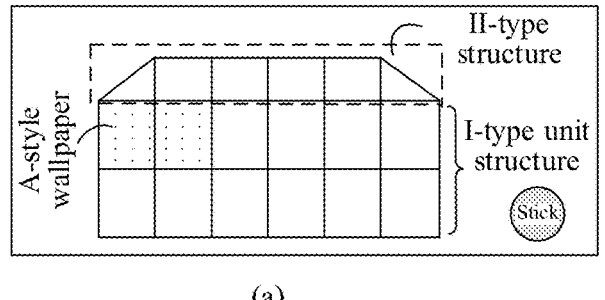
(a)
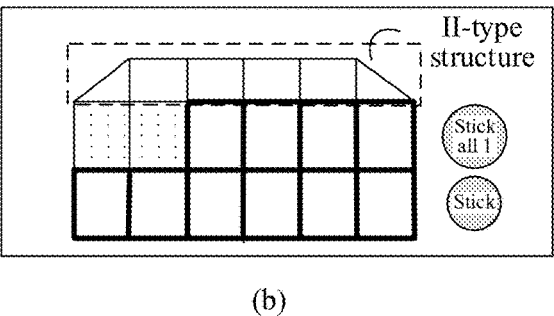
(b)
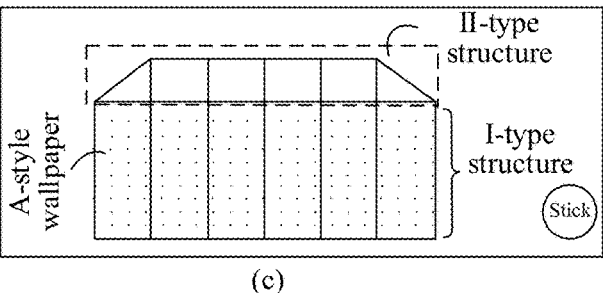
(c)
FIG. 11

1

TARGET OPERATION BATCH EXECUTION METHOD AND APPARATUS, STORAGE MEDIUM, AND ELECTRONIC DEVICE

RELATED APPLICATIONS

The present application is a continuation of International Application No. PCT/CN2023/117308, filed on Sep. 6, 2023, which claims priority to Chinese Patent Application No. 202211182995.9, filed on Sep. 27, 2022. The entire disclosures of the prior applications are hereby incorporated by reference.

FIELD OF THE TECHNOLOGY

The present disclosure relates to the field of computer technologies, including a target operation batch execution method and apparatus, a storage medium, and an electronic device.

BACKGROUND OF THE DISCLOSURE

In a virtual game scene, a plurality of different types of virtual objects are usually set, and a virtual character is allowed to perform decoration, movement, or the like on the virtual objects by performing a target operation to increase fun of a game, so that the virtual objects present a display effect meeting a personalized requirement of a user.

For example, a house under construction includes three floors in total, and each floor includes 20 structures. In this case, a player needs to execute the following procedures to perform a sticking operation on a structure: moving a virtual character, aligning with a target structure, and clicking a "stick" button, to complete sticking. Because the house includes 60 structures in total, it means that the player needs to repeat the foregoing operation 60 times to complete wallpaper sticking for the house, which consumes a large amount of operation time and results in a technical problem of low efficiency in a process of performing operations on virtual objects.

Currently, there is no effective solution to resolve the foregoing problem.

SUMMARY

The present disclosure provides a target operation batch execution method and apparatus, a non-transitory computer-readable storage medium, and an electronic device, to address a technical problem of low efficiency in a process of performing operations on virtual objects.

According to one aspect of the present disclosure, a target operation batch execution method is provided. In the method, a target virtual character is displayed in a game scene. The game scene includes a group of virtual objects and each virtual object in the group of virtual objects is available for the target virtual character to perform a target operation. A batch option is displayed when the target operation is selected by the target virtual character for a subset of the group of virtual objects and a number of the subset of the group of virtual objects is greater than or equal to a preset threshold. A batch target operation is performed based on a trigger operation on the batch option. The batch option is configured to perform the batch target operation on the group of virtual objects.

According to an aspect of the present disclosure, a target operation batch execution apparatus is further provided. The apparatus includes processing circuitry configured to display a target virtual character in a game scene. The game scene includes a group of virtual objects and each virtual object in the group of virtual objects is available for the target virtual character to perform a target operation. The processing circuitry is configured to display a batch option when the target operation is selected by the target virtual character for a subset of the group of virtual objects and a number of the subset of the group of virtual objects is greater than or equal to a preset threshold. The processing circuitry is configured to perform a batch target operation based a trigger operation on the batch option. The batch option being configured to perform the batch target operation on the group of virtual objects.

According to an aspect of the present disclosure, a non-transitory computer-readable storage medium is further provided, having a computer program stored therein, the computer program being configured to, when run, perform the foregoing target operation batch execution method.

According to another aspect of the present disclosure, a computer program product is further provided, including a computer program/instructions, the computer program/instructions, when executed by a processor, implementing operations of the foregoing method.

According to still another aspect of the present disclosure, an electronic device is further provided, including a memory and a processor, the memory having a computer program stored therein, and the processor being configured to perform the foregoing target operation batch execution method by using the computer program.

Through the foregoing disclosure, for example, when a target operation is performed by a target virtual character on a part of virtual objects in a game scene and a quantity of the part of virtual objects is greater than or equal to a preset quantity threshold, a batch execution button is displayed; and the target operation is performed in batches on remaining virtual objects in response to a trigger operation on the batch execution button. In this way, a quantity of times that a player repeats the target operation is reduced, and operation time is reduced, thereby resolving a problem of low efficiency in a process of performing operations on the virtual objects in the related art, and achieving a technical effect of improving operation efficiency on the virtual objects.

BRIEF DESCRIPTION OF THE DRAWINGS

Accompanying drawings described herein are provided for further understanding of the present disclosure and constitute a part of this disclosure. Examples of the present disclosure and the description thereof are configured for explaining the present disclosure rather than constituting a limitation to the present disclosure. In the accompanying drawings:

FIG. 2 is an example flowchart of a target operation batch execution method according to an aspect of the present disclosure.

FIG. 11 is an example schematic diagram (6) of a target operation batch execution method according to an aspect of the present disclosure.

DETAILED DESCRIPTION

To aid a person skilled in the art to understand the solutions in the present disclosure better, the following describes technical solutions in the present disclosure with reference to the accompanying drawings in the present disclosure. Other aspects obtained by a person of ordinary skill in the art based on the present disclosure shall fall within the protection scope of the present disclosure.

The terms such as "first" and "second" in this specification, the claims, and the foregoing accompanying drawings of the present disclosure are intended to distinguish between similar objects rather than describe a particular sequence or a chronological order. Data used in this way is exchangeable in a proper case, so that the present disclosure described herein can be implemented in an order different from the order shown or described herein. In addition, the terms "include", "comprise", "contain", and any other variants mean to cover the non-exclusive inclusion, for example, a process, method, system, product, or device that includes a list of operations or units is not necessarily limited to those expressly listed operations or units, but may include other operations or units not expressly listed or inherent to such a process, method, system, product, or device. The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

Figure 1:
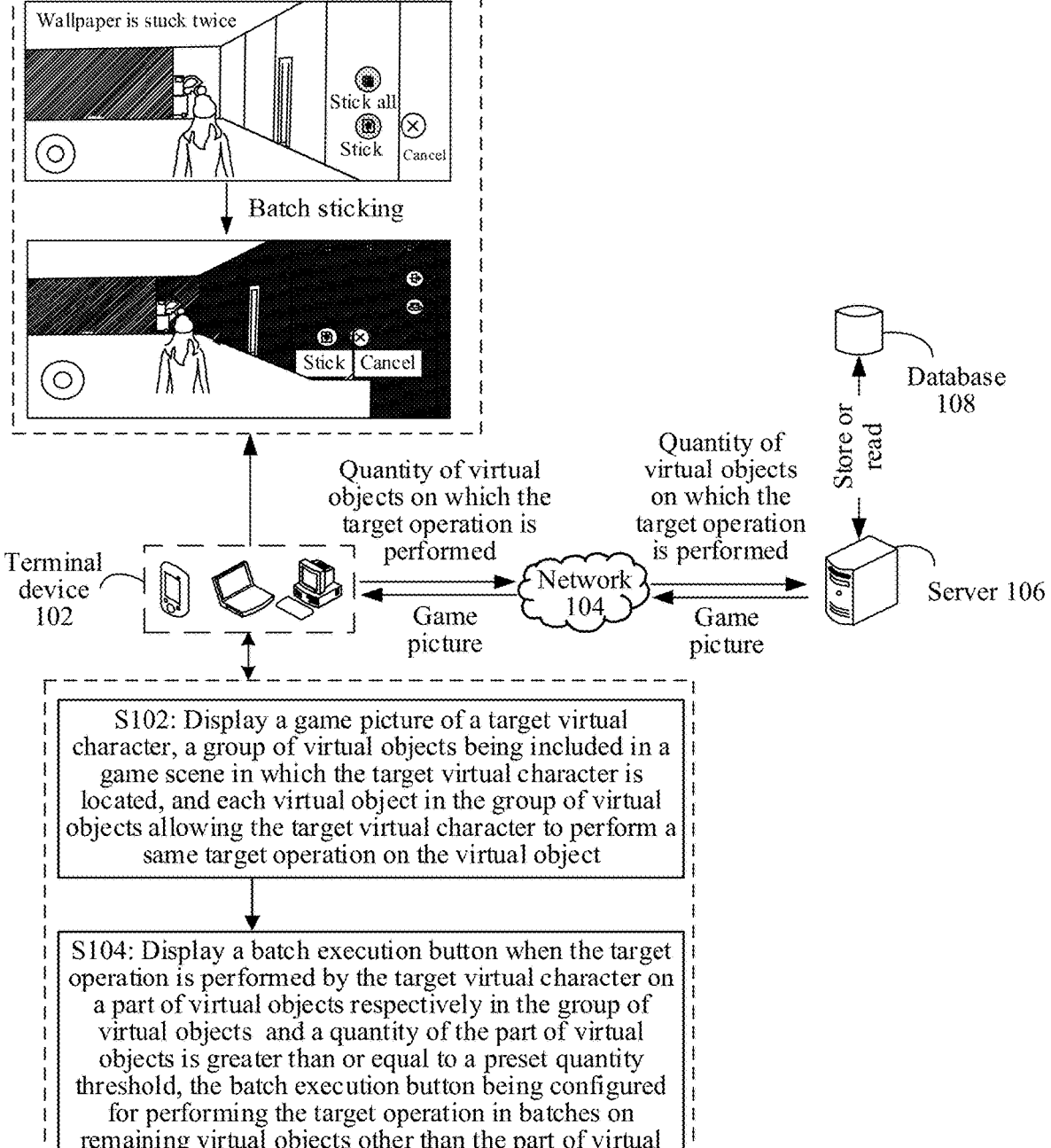
FIG. 1 is an example schematic diagram of an application scenario of a target operation batch execution method according to an aspect of the present disclosure.

According to one aspect of the present disclosure, a target operation batch execution method is provided. In an example, the target operation batch execution method may be applied to an application scenario shown in FIG. 1, but is not limited thereto. In the application scenario shown in FIG. 1, a terminal device 102 may communicate with a server 106 through a network 104, but is not limited thereto; and the server 106 may perform an operation on a database 108, for example, a data writing operation or a data reading operation, but is not limited thereto. The terminal device 102 may include, but is not limited to, a human-machine interaction screen, a processor, and a memory. The human-machine interaction screen may be configured for displaying a game picture on the terminal device 102, a batch option (e.g., a batch execution button), a virtual object on which a target operation is performed, and the like, but is not limited thereto. The processor may be configured to perform, in response to a human-machine interaction operation, a corresponding operation; or generate a corresponding instruction, and transmit the generated instruction to the server 106, but is not limited thereto. The memory is configured to store related processing data, for example, a quantity of a part of virtual objects on which the target operation is performed, a preset quantity threshold, and a trigger instruction on the batch execution button.

In an example, the following operations in the target operation batch execution method may be performed on the server 106. Operation S102: Display a game picture of a target virtual character, a group of virtual objects being included in a game scene in which the target virtual character is located, and each virtual object in the group of virtual objects allowing the target virtual character to perform a same target operation on the virtual object. Operation S104: Display a batch execution button when the target operation is performed by the target virtual character on a part of virtual objects respectively in the group of virtual objects and a quantity of the part of virtual objects is greater than or equal to a preset quantity threshold, the batch execution button being configured for performing the target operation in batches on remaining virtual objects other than the part of virtual objects in the group of virtual objects. Operation S106: Perform, in response to a trigger operation on the batch execution button, the target operation in batches on the remaining virtual objects in the group of virtual objects.

By using the foregoing manner, when a target operation is performed by a target virtual character on a part of virtual objects in a game scene and a quantity of the part of virtual objects is greater than or equal to a preset quantity threshold, a batch execution button is displayed; and the target operation is performed in batches on remaining virtual objects in response to a trigger operation on the batch execution button. In this way, a quantity of times that a player repeats the target operation is reduced, and operation time is reduced, thereby resolving a problem of low efficiency in a process of performing operations on the virtual objects in the related art, and achieving a technical effect of improving operation efficiency on the virtual objects.

Figure 3:
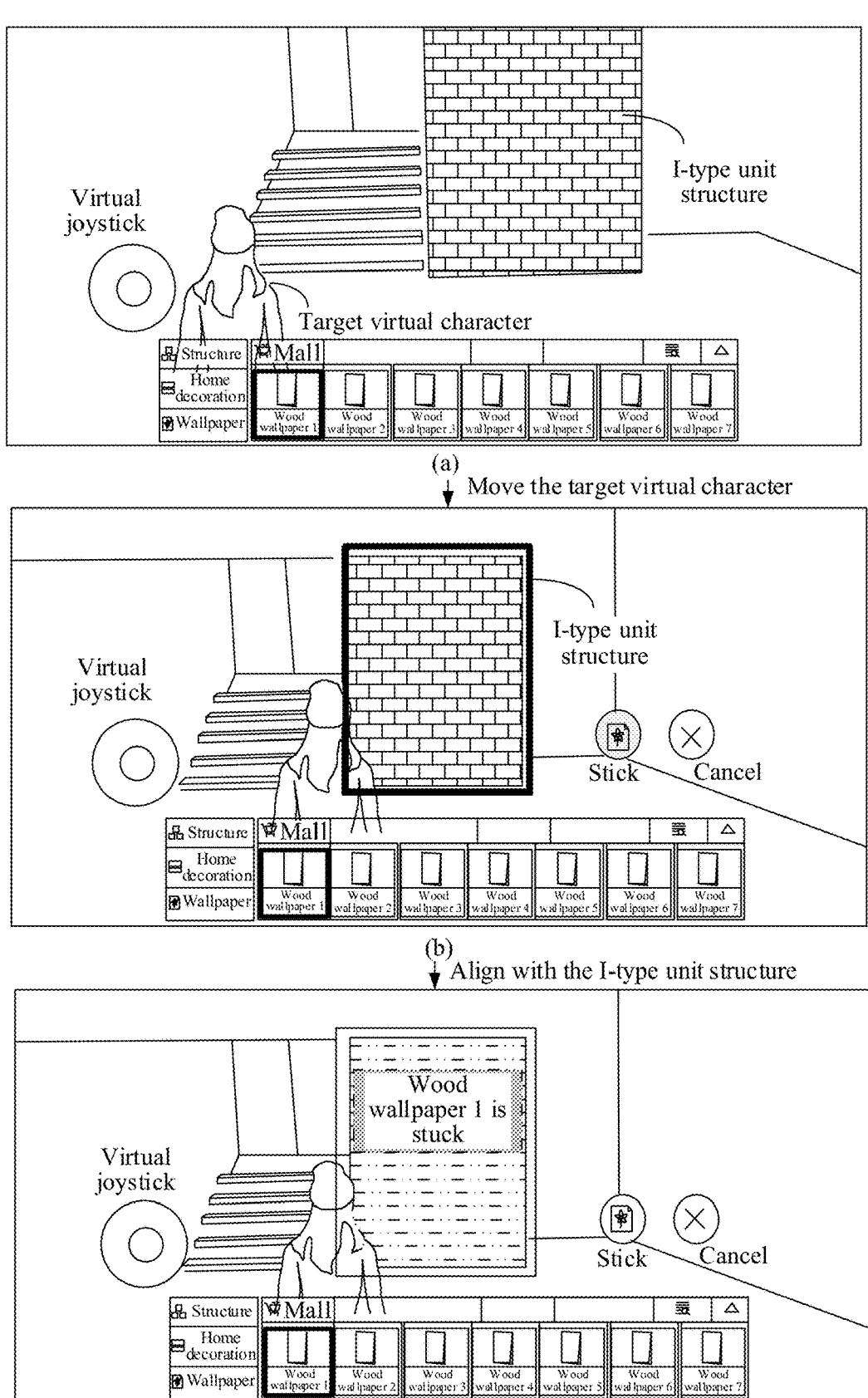
FIG. 3 is an example schematic diagram of performing a target operation once on a virtual object according to an aspect of the present disclosure.

Before describing the aspects of this disclosure, by using FIG. 3 as an example, a basic procedure of performing a target operation once on a virtual object in a game picture is briefly described as follows:

It is assumed that a target virtual character, an I-type unit structure of a house under construction by a player, a virtual joystick configured to control the target virtual character, wallpaper that the player is allowed to select, and the like are included in a game scene shown in (a) in FIG. 3, where a house structure may be divided into a plurality of types, for example, a frame structure, a steel structure, and a hybrid structure according to a building material of a main load-bearing component of the house; and in a process of decorating the house structure, different styles of wallpaper may be configured for different types of house structures.

In this case, when a sticking operation needs to be performed on the I-type unit structure, the following execution operations on the I-type unit structure are included.

S11: Assuming that wood wallpaper 1 is used as target wallpaper of the player, the player needs to select the wood wallpaper 1 from a wallpaper mall.

S12: Move the target virtual character by controlling the virtual joystick, to cause an angle of view of the target virtual character to be aligned with the I-type unit structure, as shown in (b) in FIG. 3.

When the angle of view of the target virtual character is aligned with the I-type unit structure, a border of the I-type unit structure lights up to indicate that the I-type unit structure is selected.

S13: Click a "stick" button shown in (b) in FIG. 3, to stick the wood wallpaper 1 on the I-type unit structure.

In the related art, when the house structure includes a plurality of structures and the sticking operation needs to be completed on the plurality of structures, the foregoing operations S11 to S13 need to be repeatedly performed until the wallpaper is stuck on all structures.

When a quantity of house structures is large, and a method of repeating the foregoing operations S11 to S13 is used to perform sticking on the structures, a large amount of time needs to be consumed, lowering operation efficiency. To resolve the problem, an aspect of this disclosure provides a target operation batch execution method. FIG. 2 is a flowchart of a target operation batch execution method according to an aspect of the present disclosure.

Operation S202: Display a game picture of a target virtual character, a group of virtual objects being included in a game scene in which the target virtual character is located, and each virtual object in the group of virtual objects allowing the target virtual character to perform a same target operation on the virtual object.

Figure 4:
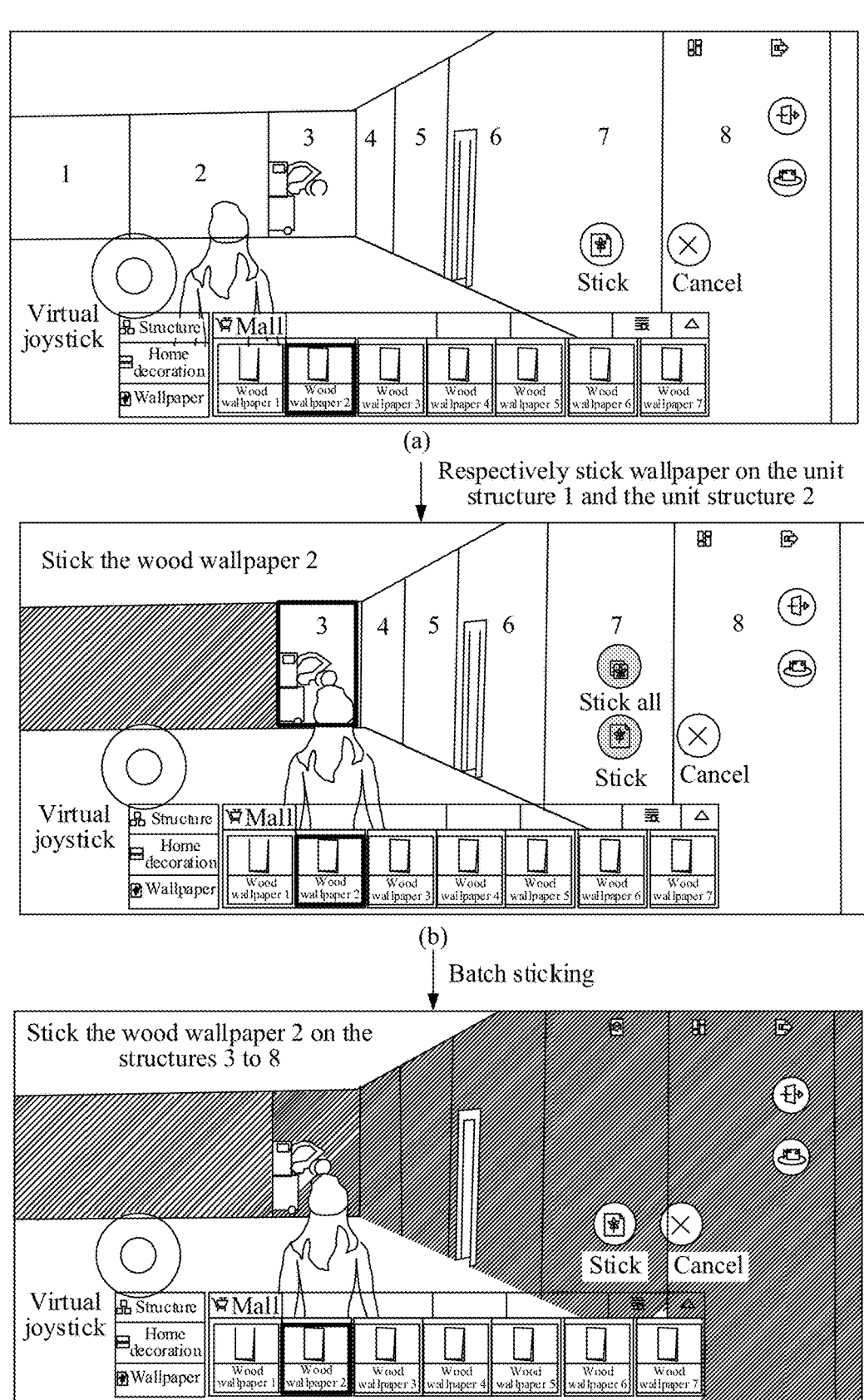
FIG. 4 is an example schematic diagram (1) of a target operation batch execution method according to an aspect of the present disclosure.

As shown in (a) in FIG. 4, assuming that a constructed house includes eight I-type unit structures, and a player intends to stick wallpaper on the eight I-type unit structures, it means that each I-type unit structure allows the target virtual character to perform a same sticking operation on the I-type unit structure.

The virtual objects in the game picture and a quantity of the virtual objects are merely an example, and are not limited thereto. In an actual game scene, the virtual objects may also be green plants, containers, or the like in the game scene.

Operation S204: Display a batch execution button when the target operation is performed by the target virtual character on a part of virtual objects respectively in the group of virtual objects and a quantity of the part of virtual objects is greater than or equal to a preset quantity threshold, the batch execution button being configured for performing the target operation in batches on remaining virtual objects other than the part of virtual objects in the group of virtual objects.

Operation S206: Perform, in response to a trigger operation on the batch execution button, the target operation in batches on the remaining virtual objects in the group of virtual objects.

Assuming that the same operations as the foregoing operations S11 to S13 are used to display the batch execution button in the game picture when the target operation is performed on the part of the virtual objects respectively in the group of virtual objects and the quantity of the part of the virtual objects is greater than or equal to the preset quantity threshold, the target operation may be performed in batches on the remaining virtual objects in the group of virtual objects in response to the trigger operation on the batch execution button, where a quantity of the remaining virtual objects is greater than or equal to two.

For example, as shown in FIG. 4, assuming that wood wallpaper 2 is selected from a wallpaper mall as target wallpaper, and the preset quantity threshold of the virtual objects on which the target operation is performed is two. When the same method as the foregoing operations S11 to S13 is used to perform the sticking operation on an I-type unit structure 1 and an I-type unit structure 2 respectively shown in FIG. 4, an angle of view of the target virtual character is aligned with an I-type unit structure 3 by controlling a virtual joystick. Because a quantity of times of repeating the foregoing operations S11 to S13 is two equal to the preset quantity threshold, the batch execution button, for example, a "stick all" button shown in (b) in FIG. 4, is displayed in the game picture, where the "stick all" button is configured for performing sticking in batches on house structures 3 to 8 that are not struck on, and the quantity of the part of virtual objects is equal to a quantity of times that the sticking operation has been performed once.

By clicking the "stick all" button, a batch paper sticking operation is performed on the I-type unit structures 3 to 8, so that the sticking operation on the remaining house structures can be completed, thereby reducing an operating procedure of repeating the foregoing operations S11 to S13, reducing operation time, and improving sticking efficiency.

The foregoing trigger operation on the batch execution button may be, but is not limited to, operations such as click, double click, and drag.

In the foregoing operation S204, when the target operation is performed by the target virtual character on the part of virtual objects respectively in the group of virtual objects and the quantity of the part of virtual objects is greater than or equal to the preset quantity threshold, in this aspect of this disclosure, it may be determined that the target operation can be performed in batches on the remaining virtual objects other than the part of virtual objects in the group of virtual objects, that is, it is determined that the remaining virtual objects meet a condition that the target operation is performed in batches. In this case, the batch execution button may be automatically displayed. In other words, in this aspect of this disclosure, whether the virtual objects meet the condition that the target operation is performed in batches can be determined, and a batch execution operation is automatically triggered when the condition is met, without triggering the batch execution operation by a user.

In an example, the displaying a batch execution button when the target operation is performed by the target virtual character on a part of virtual objects respectively in the group of virtual objects and a quantity of the part of virtual objects is greater than or equal to a preset quantity threshold includes:

displaying the batch execution button when the target operation is performed by the target virtual character on the part of virtual objects respectively in the group of virtual objects, the target operation performed on each of the part of virtual objects is a continuously performed operation, and the quantity of the part of virtual objects is greater than or equal to the preset quantity threshold; or displaying the batch execution button when the target operation is performed by the target virtual character on the part of virtual objects respectively in the group of virtual objects, the target operation performed on each of the part of virtual objects is an operation discontinuously performed within preset duration, and the quantity of the part of virtual objects is greater than or equal to the preset quantity threshold.

Therefore, in an example, when the target operation is performed by the target virtual character on the part of virtual objects respectively in the group of virtual objects and the quantity of the part of virtual objects is greater than or equal to the preset quantity threshold, if the target operation performed on each of the part of virtual objects is the continuously performed operation, or the target operation performed on each of the part of virtual objects is the operation discontinuously performed within the preset duration, it may be determined that the target operation can be performed in batches on the remaining virtual objects other than the part of virtual objects in the group of virtual objects, that is, it is determined that the remaining virtual objects meet the condition that the target operation is performed in batches.

Figures 5, 6:
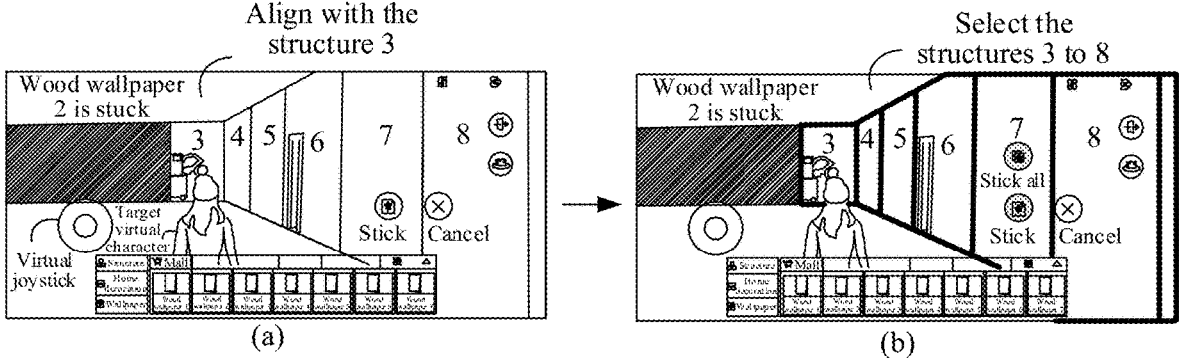
FIG. 5 is an example schematic diagram of an implementation process of displaying a batch execution button according to an aspect of the present disclosure.
FIG. 6 is an example schematic diagram of displaying a selected mark of each of remaining virtual objects according to an aspect of the present disclosure.

As shown in FIG. 5, assuming that the target operation is performed by the target virtual character on the part of virtual objects (the unit structure 1 and the unit structure 2) respectively in the group of virtual objects (the unit structures 1 to 8), a specific process of performing the target operation on the unit structure 1 and the unit structure 2 includes, but is not limited to, the following two cases.

First Case: The Continuously Performed Target Operation

Specific operations are as follows:

S51: As shown in (a) in FIG. 5, align the angle of view of the target virtual character with the unit structure 1, to select the structure 1; and click a "stick" button, to stick the wood wallpaper 2 on the unit structure 1, as shown in (b) in FIG. 5.

S52: Continue to move the target virtual character, to cause the angle of view of the target virtual character to be aligned with the unit structure 2, to select the unit structure 2; and click a "stick" button shown in (c) in FIG. 5, to stick the wood wallpaper 2 on the unit structure 2, as shown in (d) in FIG. 5.

S53: Move the target virtual character again, to cause the angle of view of the target virtual character to be aligned with the unit structure 3, as shown in (c) in FIG. 5; and display a "stick all" button in response to a selection operation on the unit structure 3, and display a selected mark of each of the unit structures 3 to 8 (that is, a border lights up). Specifically, refer to (f) in FIG. 5.

Operations S51 and S52 are continuous, in other words, there is no interruption between S51 and S52.

Second Case: The Discontinuously Performed Operation

After operation S51 is performed, the wood-grain wallpaper 2 is stuck on the unit structure 1. In this case, it is assumed that the player enters a "home decoration" page in the mall, and selects another ornament to decorate the house, for example, a curtain or a piece of furniture.

After exiting the "home decoration" page, the player then performs operation S52, so that the wood wallpaper 2 is also stuck on the unit structure 2.

For the first case, because the sticking operation is continuously performed on the unit structure 1 and the structure 2, a repeated operation by the player is easily recognized, and a shortcut operation is provided, for example, the "stick all" button is displayed. For the second case, assuming that total duration from starting of operation S51 to completion of operation S52 is t, if t is less than or equal to the preset duration, a current sticking operation is also determined as a repeated operation, and the "stick all" button is displayed; otherwise the "stick all" button is not displayed.

Through the foregoing disclosure, when a target operation is performed by a target virtual character on a part of virtual objects in a game scene and a quantity of the part of virtual objects is greater than or equal to a preset quantity threshold, a batch execution button is displayed; and the target operation is performed in batches on remaining virtual objects in response to a trigger operation on the batch execution button. In this way, a quantity of times that a player repeats the target operation is reduced, and operation time is reduced, thereby resolving a problem of low efficiency in a process of performing operations on the virtual objects in the related art, and achieving a technical effect of improving operation efficiency on the virtual objects.

In an example, the displaying a batch execution button when the target operation is performed by the target virtual character on a part of virtual objects respectively in the group of virtual objects and a quantity of the part of virtual objects is greater than or equal to a preset quantity threshold includes:

displaying, when the target operation is performed by the target virtual character on the part of virtual objects respectively in the group of virtual objects and the quantity of the part of virtual objects is greater than or equal to the preset quantity threshold, the batch execution button in response to a selection operation on one of the remaining virtual objects.

As shown in (a) in FIG. 6, assuming that the preset quantity threshold is 2, after the sticking operation is performed by the target virtual character on the unit structure 1 and the unit structure 2, when the target virtual character is moved by controlling the virtual joystick to cause the angle of view of the target virtual character to be aligned with the unit structure 3, the unit structure 3 is selected, and the batch execution button is displayed in the game picture, in other words, a "stick all" button is displayed, as shown in (b) in FIG. 6.

For example, the displaying the batch execution button in response to a selection operation on one of the remaining virtual objects includes:

displaying the batch execution button in response to the selection operation on the one of the remaining virtual objects, and displaying a selected mark of each of the remaining virtual objects, where the selected mark of each of the remaining virtual objects indicates that each of the remaining virtual objects is selected.

With reference to an analysis of the foregoing disclosure, it can be learned that the batch execution button is configured for performing the target operation in batches on the remaining virtual objects other than the part of virtual objects in the group of virtual objects. In other words, the "stick all" button shown in (b) in FIG. 6 is configured for performing the target operation in batches on remaining virtual objects other than the unit structure 1 and the unit structure 2. Therefore, if the unit structure 3 is selected (when the angle of view of the target virtual character is aligned with the unit structure 3), when the "stick all" button is displayed in the game picture, the selected mark of each of the remaining virtual objects (the unit structures 3 to 8), for example, as shown in (b) in FIG. 6, a border of each of the unit structures 3 to 8 lights up.

Apparently, a process of displaying the selected mark of each of the remaining virtual objects shown in FIG. 6 is merely an example, and is not limited thereto. For example, in addition to the unit structure 3, any one of the unit structures 4 to 8 may also be selected. In any case, the batch execution button is displayed, and the selected mark of each of the remaining virtual objects is displayed.

By using the foregoing manner, when the target operation is performed by the target virtual character on the part of virtual objects respectively in the group of virtual objects and the quantity of the part of virtual objects is greater than or equal to the preset quantity threshold, a repeated operation of the player is automatically recognized if any one of the remaining virtual objects is continuously selected, and a shortcut operation similar to the batch execution button is provided, thereby improving user experience.

In an example, the performing, in response to a trigger operation on the batch execution button, the target operation in batches on the remaining virtual objects in the group of virtual objects includes:

sticking, when the target operation is configured for sticking a virtual article on the virtual object, the virtual article in batches on all of the remaining virtual objects in response to the trigger operation on the batch execution button.

A specific implementation of sticking, when the target operation is configured for sticking a virtual article on the virtual object, the virtual article in batches on all of the remaining virtual objects in response to the trigger operation on the batch execution button includes:

sticking, when a target virtual article in a virtual article set is selected, the target virtual article in batches on all of the remaining virtual objects in response to the trigger operation on the batch execution button, where the virtual article set includes a group of virtual articles allowed to be stuck on the virtual objects; and/or randomly selecting, when all virtual articles in the virtual article set are not selected, one or more virtual articles from the virtual article set in response to the trigger operation on the batch execution button, and sticking the randomly selected one or more virtual articles in batches on all of the remaining virtual objects, where a virtual article stuck on each of the remaining virtual objects is one of the randomly selected one or more virtual articles.

Figures 7, 8:
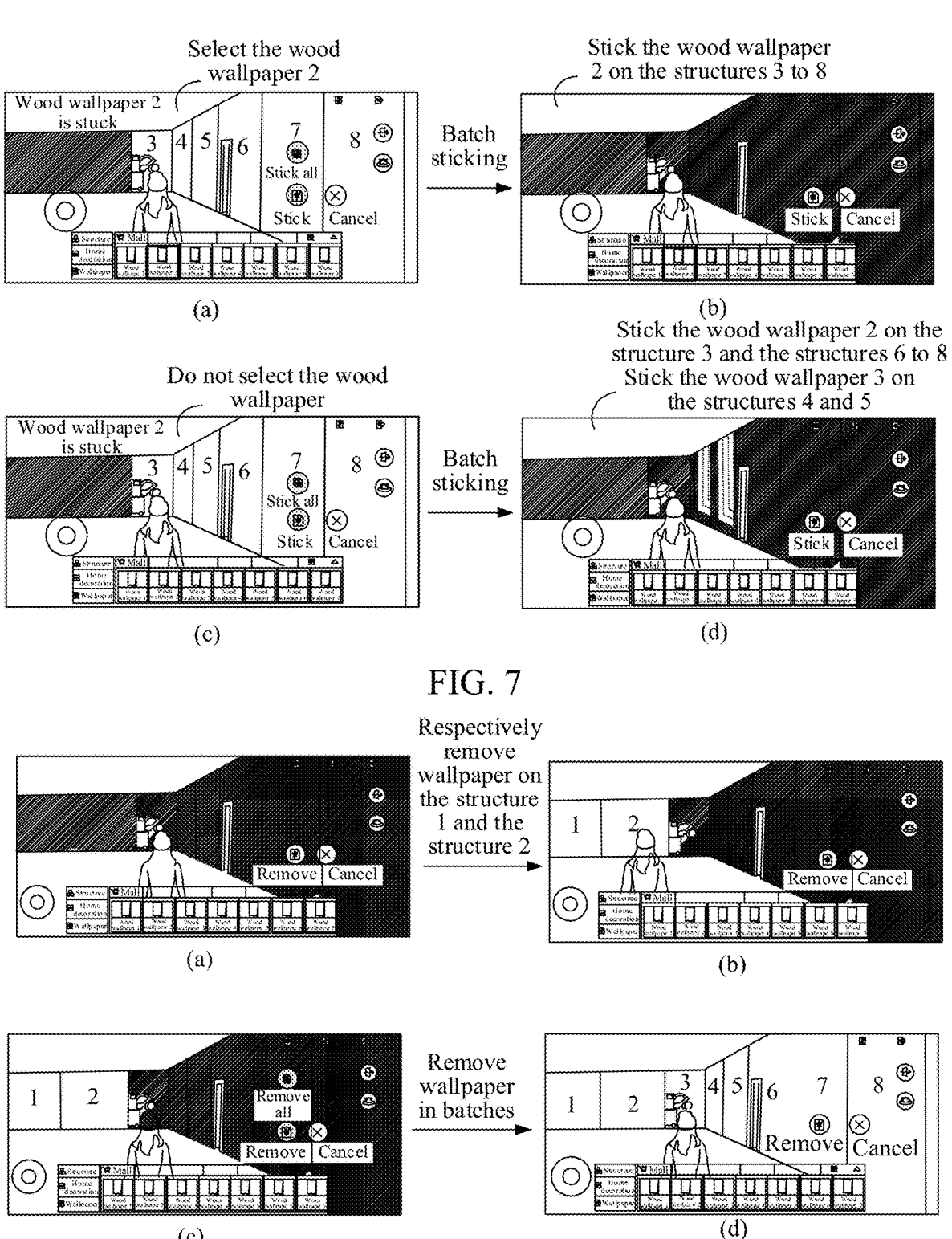
FIG. 7 is an example schematic diagram (2) of a target operation batch execution method according to an aspect of the present disclosure.
FIG. 8 is an example schematic diagram (3) of a target operation batch execution method according to an aspect of the present disclosure.

For example, as shown in (a) in FIG. 7, assuming that various styles of wallpaper are included in the virtual article set, such as seven styles of wood wallpaper, the seven styles of wood wallpaper may be stuck on the unit structures 1 to 8 when a condition is met.

In a process in which the sticking operation is performed on the unit structure 1 and the unit structure 2 respectively, assuming that the wood wallpaper 2 is selected, in response to the trigger operation on the "stick all" button, the wood wallpaper 2 is struck on the unit structures 3 to 8 in batches, as shown in FIG. 7 (*b*).

In the process in which the sticking operation is performed on the unit structure 1 and the unit structure 2 respectively, as shown in (c) in FIG. 7, assuming that all the seven styles of wood wallpaper are not selected, in response to the trigger operation on the "stick all" button, one or more styles of wallpaper are randomly selected and stuck on the unit structures 3 to 8.

For example, assuming that the wood wallpaper 2 and wood wallpaper 3 are randomly selected, after the "stick all" button is clicked, the wood wallpaper 2 or wood wallpaper 3 is randomly stuck on each of the unit structures 3 to 8. As shown in (d) in FIG. 7, the wood wallpaper 2 is stuck on the unit structure 3 and the unit structures 6 to 8, and the wood wallpaper 3 is stuck on the unit structures 4 and 5.

The randomly selected wood wallpaper 2 and the wood wallpaper 3 are merely an example, and are not limited thereto. Correspondingly, the foregoing content in which the wood wallpaper 2 is stuck on the unit structure 3 and the unit structures 6 to 8, and the wood wallpaper 3 is stuck on the unit structures 4 and 5 is merely an example, and is not limited thereto. For example, wood wallpaper 4 and wood wallpaper 5 may alternatively be randomly selected, the wood wallpaper 4 is stuck on the unit structures 3 to 7, and the wood wallpaper 5 is stuck on the unit structure 8.

In addition, for the foregoing disclosure, when a condition for displaying the batch execution button is met, in addition to the trigger operation on the batch execution button, a button of the target operation once, such as the "stick" button, may also be responded to. In other words, through the target operation batch execution method in the aspects of this disclosure, a shortcut operation manner is provided only when a quantity of virtual objects on which the target operation needs to be performed is large, which does not affect displaying of and the trigger operation on the "stick" button for respectively performing the target operation on the remaining virtual objects respectively.

By using the foregoing manner, different batch operations may be performed on all of the remaining virtual objects according to whether the target virtual article in the virtual article set is selected, thereby improving flexibility of batch execution and improving applicability of the target operation batch execution method.

Apparently, that the sticking operation is performed on the virtual objects is merely an example, and is not limited thereto. For example, the target operation may be to remove the virtual articles stuck on the virtual objects, or move the virtual objects in a target area or a target virtual container. The following describes the target operations in the foregoing centralized case in detail.

Example 1

Assuming that the target operation is configured for removing a virtual article stuck on the virtual object, a specific implementation is as follows:

removing, when the target operation is configured for removing the virtual article stuck on the virtual object, virtual articles stuck on all of the remaining virtual objects in response to the trigger operation on the batch execution button.

As shown in (a) in FIG. 8, assuming that wallpaper is stuck on all the unit structures 1 to 8, and the target operation is to remove wallpaper on a unit structure, specific operations of removing the wallpaper on the unit structure by using the foregoing batch operation manner are as follows:

S81: Move the target virtual character, to cause the angle of view of the target virtual character to be aligned with the unit structure 1; and click a "remove" button shown in (a) in FIG. 8, to remove wallpaper on the unit structure 1.

S82: Continue to move the target virtual character, to cause the angle of view of the target virtual character to be aligned with the unit structure 2; and click the "remove" button again, to remove wallpaper on the unit structure 2, as shown in (b) in FIG. 8.

S83: Move the target virtual character again, to cause the angle of view of the target virtual character to be aligned with the unit structure 3; and display a "remove all" button in the game picture because a quantity of unit structures on which wallpaper is removed is equal to the preset quantity threshold, which meets the condition of displaying the batch execution button, as shown in (c) in FIG. 8.

S84: Click the "remove all" button, to remove wallpaper on the unit structures 3 to 8 in batches, as shown in (d) in FIG. 8.

Example 2

Assuming that the target operation is configured for moving the virtual object in the target area or the target virtual container, a specific implementation is as follows:

moving, when the target operation is configured for moving the virtual object in the target area, all of the remaining virtual objects in the target area in response to the trigger operation on the batch execution button; or moving, when the target operation is configured for moving the virtual object in the target virtual container, all of the remaining virtual objects in the target virtual container in response to the trigger operation on the batch execution button.

Figure 9:
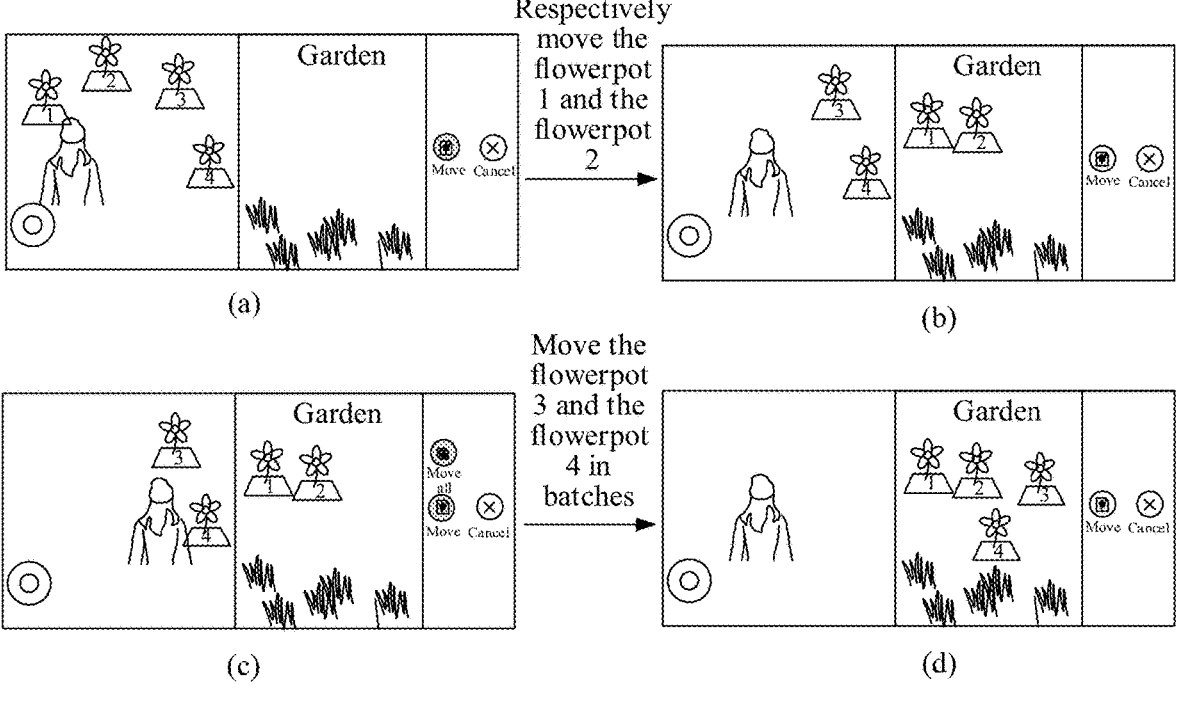
FIG. 9 is an example schematic diagram (4) of a target operation batch execution method according to an aspect of the present disclosure.

(1) With reference to FIG. 9, the following describes in detail a case in which the virtual objects are moved in the target area.

As shown in (a) in FIG. 9, assuming that the preset quantity threshold is two, a virtual object is a green plant planted in a farm, for example, a pot of flower, a group of virtual objects include four pots of flower, and the target operation is to move each of the pots of flower into a garden, a specific implementation process includes the following operations:

S91: Move the target virtual character, to cause the angle of view of the target virtual character to be aligned with a flowerpot numbered 1; and click a "move" button shown in (a) in FIG. 9, to move the flowerpot numbered 1 to the garden.

S92: Continue to move the target virtual character, to cause the angle of view of the target virtual character to be aligned with a flowerpot numbered 2; and click the "move" button again, to move the flowerpot numbered 2 to the garden, as shown in (b) in FIG. 9.

S93: Move the target virtual character again, to cause the angle of view of the target virtual character to be aligned with a flowerpot numbered 3; and display a "move all" button in the game picture because a quantity of moved flowerpots is equal to the preset quantity threshold, which meets the condition of displaying the batch execution button, as shown in (c) in FIG. 9.

S94: Click the "move all" button, to move the flowerpot numbered 3 and a flowerpot numbered 4 in batches, as shown in (d) in FIG. 9.

Figure 10:
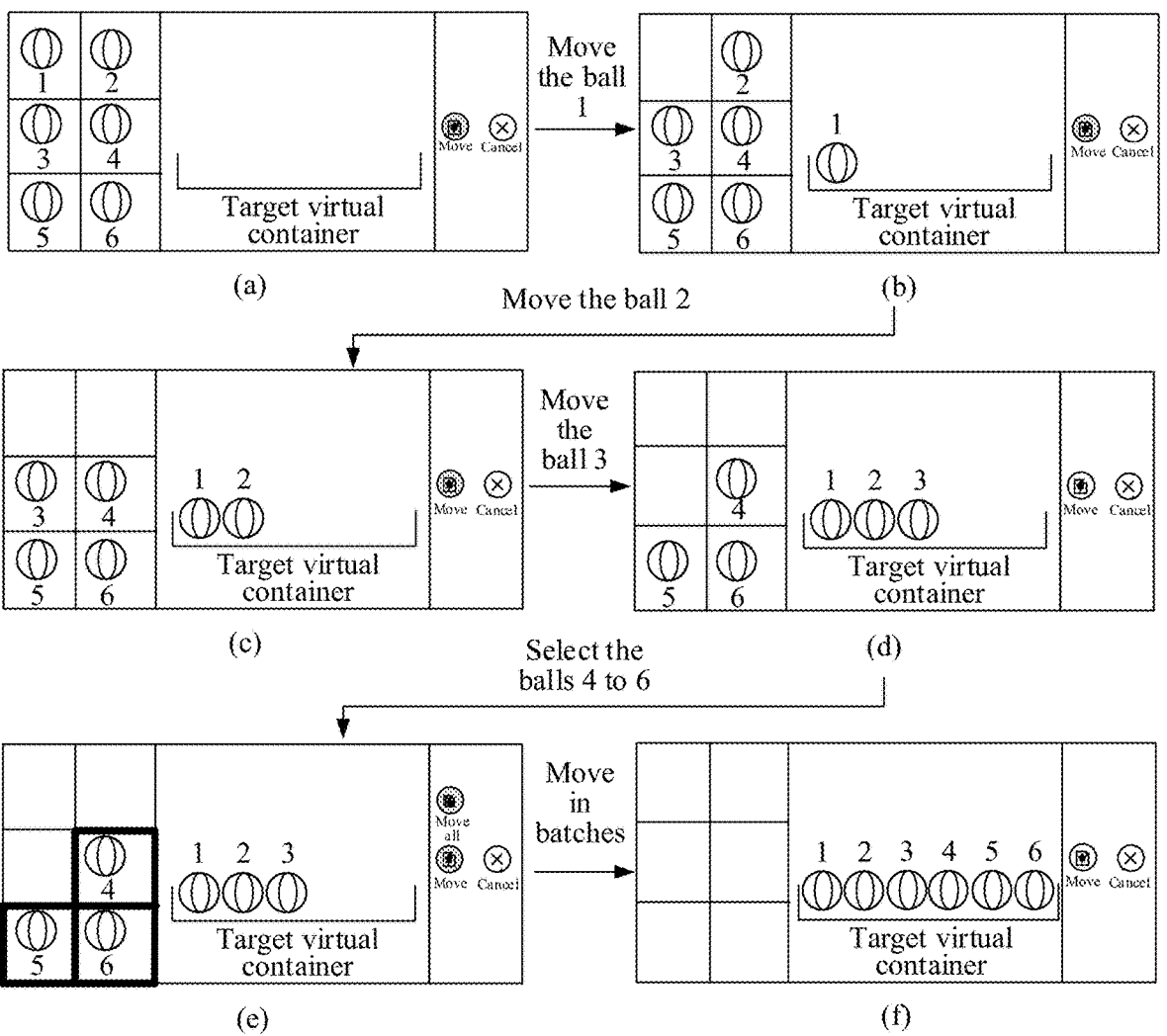
FIG. 10 is an example schematic diagram (5) of a target operation batch execution method according to an aspect of the present disclosure.

(2) With reference to FIG. 10, the following describes in detail a case in which the virtual objects are moved to the target virtual container.

As shown in (a) in FIG. 10, assuming that the preset quantity threshold is three, a virtual object is a ball, a group of virtual objects include six balls, and the target operation is to move the balls in the target virtual container, a specific implementation process includes the following operations:

S1001: Move the target virtual character, to cause the angle of view of the target virtual character to be aligned with a ball numbered 1; and click a "move" button shown in (a) in FIG. 10, to move the ball numbered 1 in the target virtual container, as shown in (b) in FIG. 10.

S1002: Continue to move the target virtual character, to cause the angle of view of the target virtual character to be aligned with a ball numbered 2; and click the "move" button, to move the ball numbered 2 in the target virtual container, as shown in (c) in FIG. 10.

S1003: Move the target virtual character again, to cause the angle of view of the target virtual character to be aligned with a ball numbered 3; and click the "move" button, to move the ball numbered 3 in the target virtual container, as shown in (d) in FIG. 10.

S1004: Further move the target virtual character, to cause the angle of view of the target virtual character to be aligned with a ball numbered 4; and display a "move all" button in the game picture, and display selected marks of balls numbered 4 to 6 because a quantity of moved balls is equal to the preset quantity threshold, namely, three, which meets the condition of display the batch execution button, as shown in (c) in FIG. 10.

S1006: Click the "move all" button, to move the balls numbered 4 to 6 in the target virtual container in batches, as shown in (f) in FIG. 10.

It can be learned from the foregoing analysis that, in the aspects of this disclosure, both the virtual object and the target operation are not limited, so that the target operation batch execution method is applicable to various scenarios, and the application scope of the method is further extended when operation efficiency of the target operation is improved.

In an example, the performing, in response to a trigger operation on the batch execution button, the target operation in batches on the remaining virtual objects in the group of virtual objects includes:

performing the target operation on only the remaining virtual objects when a first virtual object set and a second virtual object set are included in the game scene, an object type of each virtual object in the first virtual object set is a first type, an object type of each virtual object in the second virtual object set is a second type different from the first type, and the group of virtual objects are virtual objects on which the target operation is not performed in the first virtual object set.

As shown in (a) in FIG. 11, it is assumed that the first virtual object set and the second virtual object set are included in the game scene, where the first virtual object set includes a plurality of I-type unit structures of a house under construction, and the second virtual object set includes a plurality of II-type unit structures of the house under construction. In other words, types of all unit structures in the first virtual object set are the same, that is, all belong to a type I; and types of all unit structures in the second virtual object set are also the same, that is, all belong to a type II.

It is assumed that the target operation is to stick A-style wallpaper on each I-type unit structure and stick B-style wallpaper on each II-type unit structure, the preset quantity threshold is two, and the group of virtual objects are the virtual objects on which the target operation is not performed in the first virtual object set. In this case, a method similar to those shown in the foregoing operations S91 to S92 is used to perform the sticking operation on two structures in the plurality of I-type unit structures, and stick the A-style wallpaper on the two structures, as shown in (a) in FIG. 11; a method similar to that shown in the foregoing S93 is used to select remaining structures on which wallpaper is not stuck in the plurality of I-type unit structures, and display a "stick all 1" button, as shown in (b) in FIG. 11; and the "stick all 1" button is clicked to perform the batch sticking operation on all of the remaining I-type unit structures on which sticking is not performed, so that the A-style wallpaper is stuck on all of the remaining I-type unit structures on which sticking is not performed. Specifically, refer to (c) in FIG. 11.

Structure types of the I-type unit structure and the II-type unit structure are different, and the virtual articles (types of stuck target wallpaper) on which the target operation is performed are also different. Therefore, when the group of virtual objects are determined as the virtual objects on which the target operation is not performed in the first virtual object set, a repeated sticking operation of the player on the I-type unit structure is automatically recognized, and a batch operation is performed on the remaining virtual objects in the first virtual object set, so that the A-style wallpaper is stuck on all I-type unit structures.

To improve efficiency of the sticking operation, after the sticking operation on the I-type unit structures is completed, a batch sticking operation on the II-type unit structures may further be implemented in the following manner. The manner includes:

displaying an extended execution button after the target operation is performed in batches on the remaining virtual objects in the group of virtual objects, where the extended execution button is configured for performing the target operation in batches on virtual objects on which the target operation is not performed in the second virtual object set; and performing, in response to a trigger operation on the extended execution button, the target operation in batches on the virtual objects on which the target operation is not performed in the second virtual object set.

In this example, after the batch sticking operation on the I-type unit structures is completed, a specific implementation of performing the batch paper sticking operations on the II-type unit structures includes, but is not limited to, the following two types.

Example 3

Figure 12:
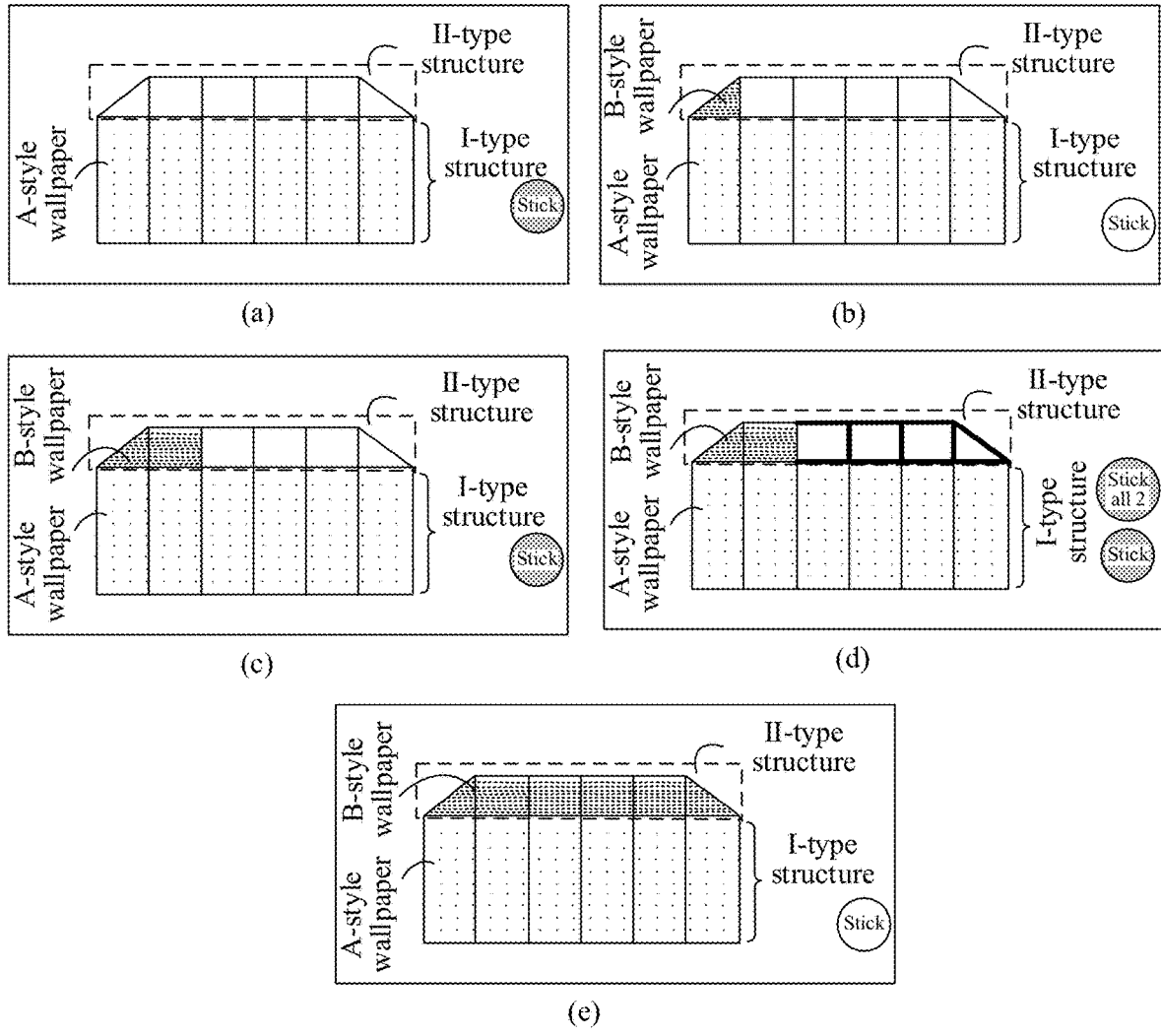
FIG. 12 is an example schematic diagram (7) of a target operation batch execution method according to an aspect of the present disclosure.

S1211: As shown in (a) in FIG. 12, move the target virtual character after the sticking operation on the I-type unit structures is completed, to cause the angle of view of the target virtual character to be aligned with one of the II-type unit structures; and click a "stick" button, to stick the B-style wallpaper on a selected II-type unit structure, as shown in (b) in FIG. 12.

S1212: Continue to move the angle of view of the target virtual character, to cause the angle of view to be aligned with a second II-type unit structure, and perform the sticking operation on the second II-type unit structure, where an operation result is shown in (c) in FIG. 12.

S1213: Move the target virtual character again, to cause the angle of view of the target virtual character to be aligned with one structure on which sticking is not performed in the II-type unit structures; display a "stick all 2" button, and display selected marks (for example, borders light up) of all II-type unit structures on which sticking is not performed because a quantity of II-type unit structures on which the sticking operation is performed on is equal to the preset quantity threshold, as shown in (d) in FIG. 12.

S1214: Click the "stick all 2" button, to perform the batch paper sticking operation on all the II-type unit structures on which sticking is not performed, so that the B-style wallpaper is stuck on all the II-type unit structures.

In a process of performing the sticking operation on the II-type unit structures, the used B-style wallpaper may be, but is not limited to, a randomly selected style of wallpaper from a wallpaper set when the angle of view of the target virtual character is aligned with the II-type unit structures. In other words, target wallpaper for performing the paper sticking operation on the II-type unit structures is automatically selected when the II-type unit structures are selected, where the wallpaper used on the I-type unit structures and the wallpaper used on the II-type unit structures may be the same or different. This is not limited in the examples.

Example 4

To further improve efficiency of the sticking operations, after sticking on the I-type unit structures is completed through the batch paper sticking operation, because the batch operation of the player has been automatically recognized, a system considers that the player intends to continue to perform the batch operation by default when any one of the II-type unit structures is selected. In this way, the "stick all 2" button is displayed in the game picture, and batch sticking is performed on all the II-type unit structures by clicking the "stick all 2" button.

By using the foregoing manner, when a plurality of virtual object sets are included in the game scene and types of virtual objects in any two virtual object sets are different, the batch execution button and the extended execution button may be sequentially displayed based a type of a selected virtual object, and the target operation is sequentially performed on virtual objects on which the target operation is not performed in each virtual object set in response to a trigger operation on each execution button, thereby implementing repeatability of the batch execution operation, reducing a quantity of execution times of the target operation, and improving operation efficiency.

Figure 13:
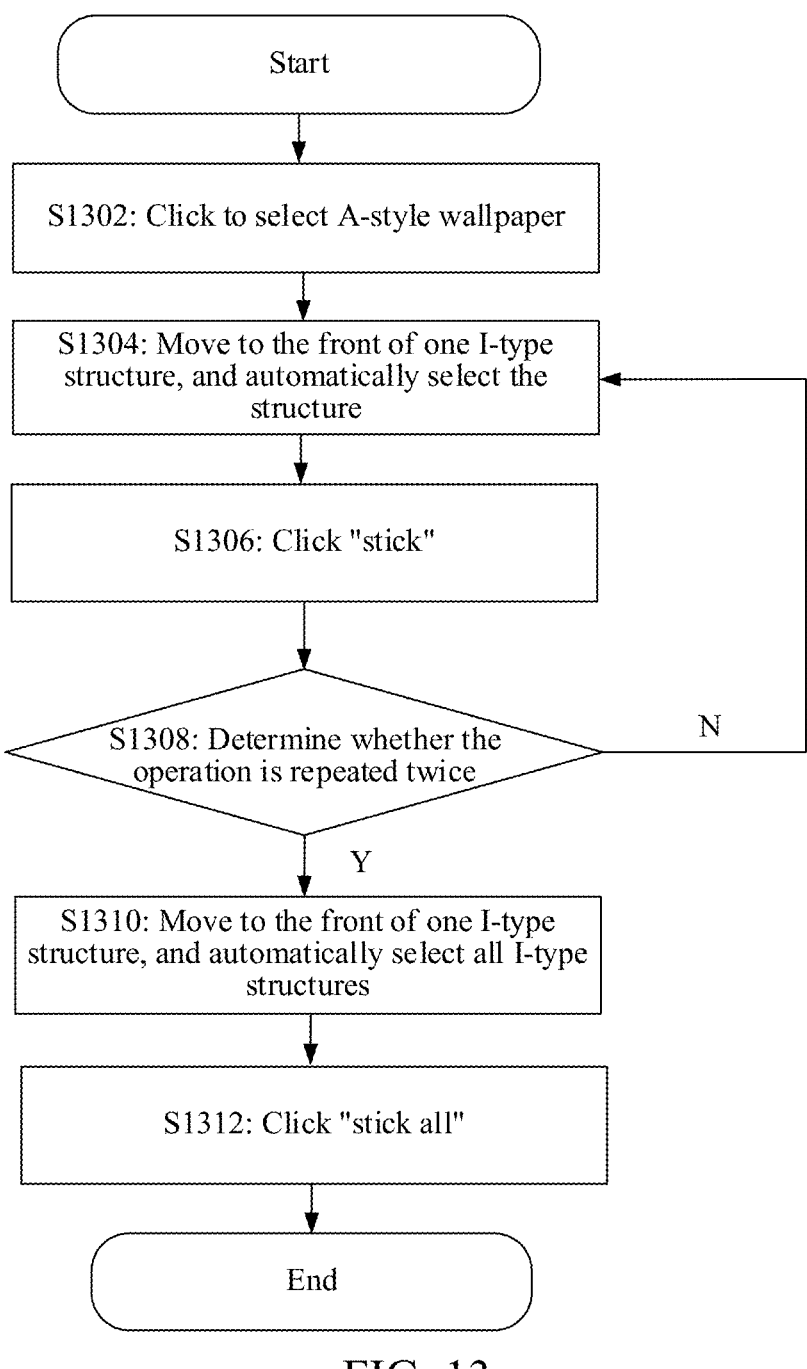
FIG. 13 is an example overall flowchart of a target operation batch execution method according to an aspect of the present disclosure.
Figure 14:
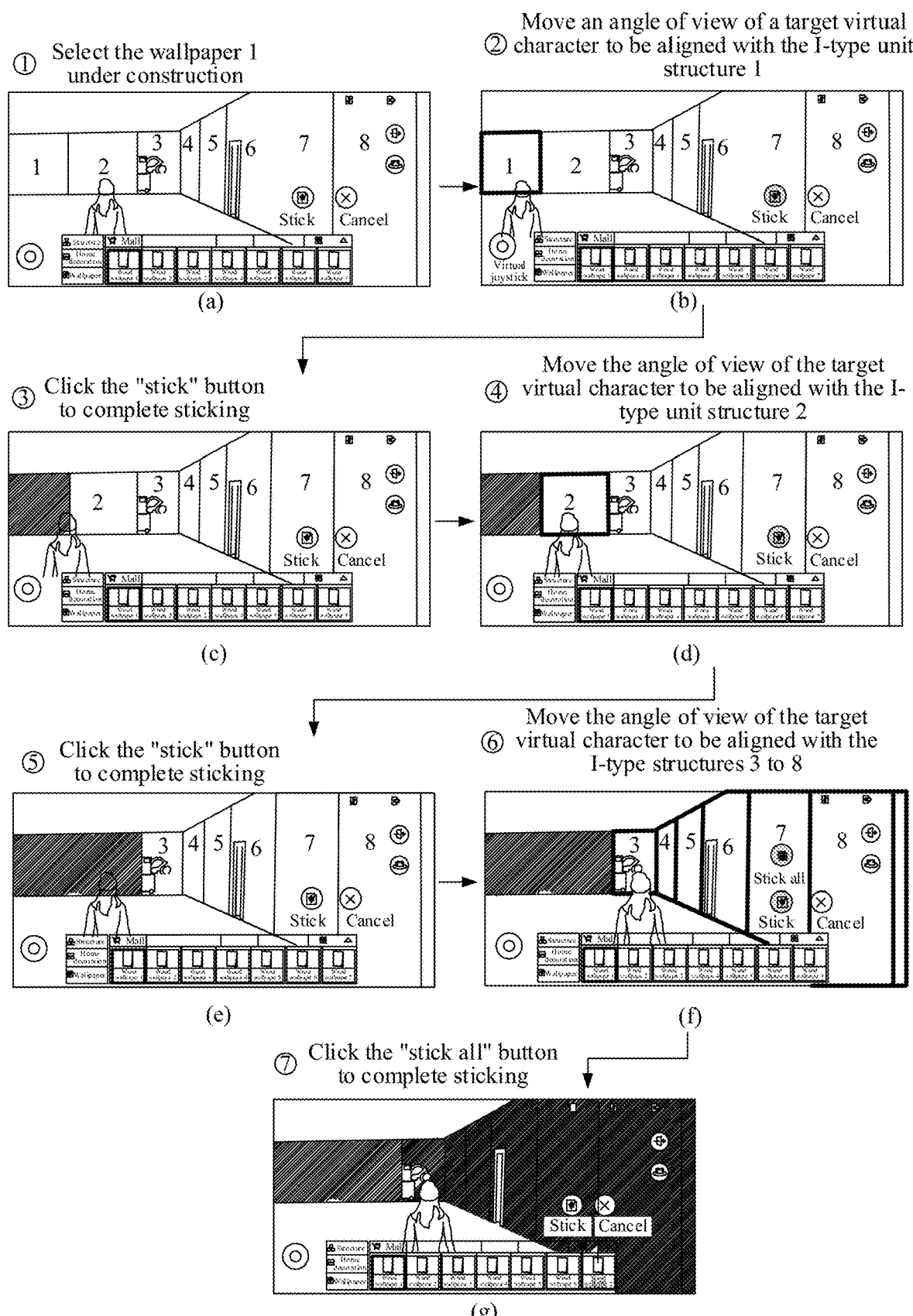
FIG. 14 is an example overall schematic diagram of a target operation batch execution method according to an aspect of the present disclosure.

To better understand the disclosure, the following makes further descriptions with reference to an overall flowchart shown in FIG. 13 and an overall schematic diagram shown in FIG. 14. Specifically, the following operations are included.

S1302: Click to select A-style wallpaper.

As shown in (a) in FIG. 14, to decorate a house under construction, one style of wallpaper is selected from a wallpaper set, for example, wood wallpaper 1 is selected. A selection manner may be, but is not limited to, random selection, selection according to a preference of a player, or the like.

S1304: Move a target virtual character to the front of one I-type unit structure, and automatically select the unit structure.

As shown in (b) in FIG. 14, a position of the target virtual character in a game scene is moved by controlling a virtual joystick, to cause an angle of view of the moved target virtual character to be aligned with the I-type unit structure;

and the aligned I-type unit structure is automatically selected, and a selected mark of the I-type unit structure is displayed, for example, the border lights up.

S1306: Click a "stick" button, to stick the wood wallpaper 1 on an I-type unit structure 1, as shown in (c) in FIG. 14.

S1308: Determine whether a quantity of times that the operation is repeated is greater than a preset quantity threshold.

Before the quantity of times that the operation is repeated is determined, operations such as selecting a unit structure 2, clicking the "stick" button, and perform a sticking operation on the unit structure 2 are sequentially performed by using same operation as the foregoing operations S1302 to S1304, specifically, as shown in (d) to (e) in FIG. 14.

If a quantity of unit structures on which the sticking operation is performed is greater than the preset quantity threshold, namely, two, operation S1310 is performed; otherwise, operation S1304 is performed.

S1310: Move the target virtual character to the front of one I-type unit structure, and automatically select all I-type unit structures.

For example, the target virtual character is moved to the front of an I-type unit structure 3, to cause the angle of view of the target virtual character to be aligned with the unit structure. In this case, I-type unit structures 3 to 8 on which the sticking operation is performed are automatically selected, as shown in (f) in FIG. 14, selected marks of the I-type unit structures 3 to 8 are displayed, and a "stick all" button is displayed at the same time.

S1312: Click the "stick all" button, to perform the batch sticking operation on the I-type unit structures 3 to 8. Specifically, refer to (g) in FIG. 14.

By using the foregoing manner, when a target operation is performed by a target virtual character on a part of virtual objects in a game scene and a quantity of the part of virtual objects is greater than or equal to a preset quantity threshold, a batch execution button is displayed; and the target operation is performed in batches on remaining virtual objects in response to a trigger operation on the batch execution button. In this way, a quantity of times that a player repeats the target operation is reduced, and operation time is reduced, thereby resolving a problem of low efficiency in a process of performing operations on the virtual objects in the related art, and achieving a technical effect of improving operation efficiency on the virtual objects.

For simple description, the foregoing method are represented as a series of actions, but a person skilled in the art is to know that the present disclosure is not limited to the described order of the actions because some operations may be performed in another order or performed simultaneously according to the present disclosure. In addition, a person skilled in the art is also to know that all the aspects described in this disclosure, the related actions and modules are not necessarily required in the present disclosure.

Figure 15:
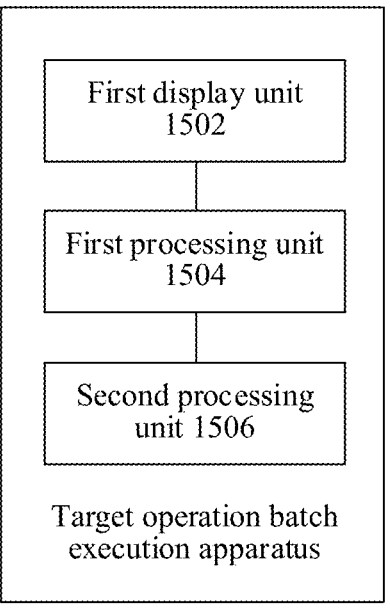
FIG. 15 is an example schematic structural diagram of a target operation batch execution apparatus according to an aspect of the present disclosure.

According to another aspect of the present disclosure, a target operation batch execution apparatus is further provided as shown in FIG. 15, and the apparatus includes the following units.

A first display unit 1502 is configured to display a game picture of a target virtual character, a group of virtual objects being included in a game scene in which the target virtual character is located, and each virtual object in the group of virtual objects allowing the target virtual character to perform a same target operation on the virtual object.

As shown in (a) in FIG. 4, assuming that a constructed house includes eight I-type unit structures, and a player intends to stick wallpaper on the eight I-type unit structures, it means that each I-type unit structure allows the target virtual character to perform a same sticking operation on the I-type unit structure.

The virtual objects in the game picture and a quantity of the virtual objects are merely an example, and are not limited thereto. In an actual game scene, the virtual objects may also be green plants, containers, or the like in the game scene.

A first processing unit 1504 is configured to display a batch execution button when the target operation is performed by the target virtual character on a part of virtual objects respectively in the group of virtual objects and a quantity of the part of virtual objects is greater than or equal to a preset quantity threshold, the batch execution button being configured for performing the target operation in batches on remaining virtual objects other than the part of virtual objects in the group of virtual objects.

A second processing unit 1506 is configured to perform, in response to a trigger operation on the batch execution button, the target operation in batches on the remaining virtual objects in the group of virtual objects.

Assuming that the same operations as the foregoing operations S11 to S13 are used to display the batch execution button in the game picture when the target operation is performed on the part of the virtual objects respectively in the group of virtual objects and the quantity of the part of the virtual objects is greater than or equal to the preset quantity threshold, the target operation may be performed in batches on the remaining virtual objects in the group of virtual objects in response to the trigger operation on the batch execution button, where a quantity of the remaining virtual objects is greater than or equal to two.

For example, as shown in FIG. 4, assuming that wood wallpaper 2 is selected from a wallpaper mall as target wallpaper, and the preset quantity threshold of the virtual objects on which the target operation is performed is two. When the same method as the foregoing operations S11 to S13 is used to perform the sticking operation on an I-type unit structure 1 and an I-type unit structure 2 respectively shown in FIG. 4, an angle of view of the target virtual character is aligned with an I-type unit structure 3 by controlling a virtual joystick. Because a quantity of times of repeating the foregoing operations S11 to S13 is two equal to the preset quantity threshold, the batch execution button, for example, a "stick all" button shown in (b) in FIG. 4, is displayed in the game picture, where the "stick all" button is configured for performing sticking in batches on house structures 3 to 8 that are not struck on, and the quantity of the part of virtual objects is equal to a quantity of times that the sticking operation has been performed once.

By clicking the "stick all" button, the batch sticking operation is performed on the I-type unit structures 3 to 8, so that the sticking operation on the remaining house structures can be completed, thereby reducing an operating procedure of repeating the foregoing operations S11 to S13, reducing operation time, and improving sticking efficiency.

The foregoing trigger operation on the batch execution button may be, but is not limited to, operations such as click, double click, and drag.

By using the foregoing apparatus, when a target operation is performed by a target virtual character on a part of virtual objects in a game scene and a quantity of the part of virtual objects is greater than or equal to a preset quantity threshold, a batch execution button is displayed; and the target operation is performed in batches on remaining virtual objects in response to a trigger operation on the batch execution button. In this way, a quantity of times that a player repeats the target operation is reduced, and operation time is reduced, thereby resolving a problem of low efficiency in a process of performing operations on the virtual objects in the related art, and achieving a technical effect of improving operation efficiency on the virtual objects.

In an example, the first processing unit 1504 includes:

a first processing module, configured to display, when the target operation is performed by the target virtual character on the part of virtual objects respectively in the group of virtual objects and the quantity of the part of virtual objects is greater than or equal to the preset quantity threshold, the batch execution button in response to a selection operation on one of the remaining virtual objects.

In an example, the first processing module includes:

a first processing submodule, configured to display the batch execution button in response to the selection operation on the one of the remaining virtual objects, and display a selected mark of each of the remaining virtual objects, where the selected mark of each of the remaining virtual objects indicates that each of the remaining virtual objects is selected.

In an example, the first processing unit 1504 includes:

a second processing module, configured to display the batch execution button when the target operation is performed by the target virtual character on the part of virtual objects respectively in the group of virtual objects, the target operation performed on each of the part of virtual objects is a continuously performed operation, and the quantity of the part of virtual objects is greater than or equal to the preset quantity threshold; or display the batch execution button when the target operation is performed by the target virtual character on the part of virtual objects respectively in the group of virtual objects, the target operation performed on each of the part of virtual objects is an operation discontinuously performed within preset duration, and the quantity of the part of virtual objects is greater than or equal to the preset quantity threshold.

In an example, the second processing unit 1506 includes:

a third processing module, configured to stick, when the target operation is configured for sticking a virtual article on the virtual object, the virtual article in batches on all of the remaining virtual objects in response to the trigger operation on the batch execution button.

In an example, the third processing module includes:

a second processing submodule, configured to stick, when a target virtual article in a virtual article set is selected, the target virtual article in batches on all of the remaining virtual objects in response to the trigger operation on the batch execution button, where the virtual article set includes a group of virtual articles allowed to be stuck on the virtual objects; and/or randomly select, when all virtual articles in the virtual article set are not selected, one or more virtual articles from the virtual article set in response to the trigger operation on the batch execution button, and stick the randomly selected one or more virtual articles in batches on all of the remaining virtual objects, where a virtual article stuck on each of the remaining virtual objects is one of the randomly selected one or more virtual articles.

In an example, the second processing unit 1506 includes:

a fourth processing module, configured to remove, when the target operation is configured for removing a virtual article stuck on the virtual object, virtual articles stuck on all of the remaining virtual objects in response to the trigger operation on the batch execution button.

In an example, the second processing unit 1506 includes:

a fifth processing module, configured to move, when the target operation is configured for moving the virtual object in a target area, all of the remaining virtual objects in the target area in response to the trigger operation on the batch execution button; or move, when the target operation is configured for moving the virtual object in a target virtual container, all of the remaining virtual objects in the target virtual container in response to the trigger operation on the batch execution button.

In an example, the second processing unit 1506 includes:

a sixth processing module, configured to perform the target operation on only the remaining virtual objects when a first virtual object set and a second virtual object set are included in the game scene, an object type of each virtual object in the first virtual object set is a first type, an object type of each virtual object in the second virtual object set is a second type different from the first type, and the group of virtual objects are virtual objects on which the target operation is not performed in the first virtual object set.

In an example, the foregoing apparatus further includes:

a second display unit, configured to display an extended execution button after the target operation is performed in batches on the remaining virtual objects in the group of virtual objects, where the extended execution button is configured for performing the target operation in batches on virtual objects on which the target operation is not performed in the second virtual object set; and a third processing unit, configured to perform, in response to a trigger operation on the extended execution button, the target operation in batches on the virtual objects on which the target operation is not performed in the second virtual object set.

By using the foregoing apparatus, when a target operation is performed by a target virtual character on a part of virtual objects in a game scene and a quantity of the part of virtual objects is greater than or equal to a preset quantity threshold, a batch execution button is displayed; and the target operation is performed in batches on remaining virtual objects in response to a trigger operation on the batch execution button. In this way, a quantity of times that a player repeats the target operation is reduced, and operation time is reduced, thereby resolving a problem of low efficiency in a process of performing operations on the virtual objects in the related art, and achieving a technical effect of improving operation efficiency on the virtual objects.

For the target operation batch execution apparatus herein, refer to the target operation batch execution method, and details are not described herein again.

Figure 16:
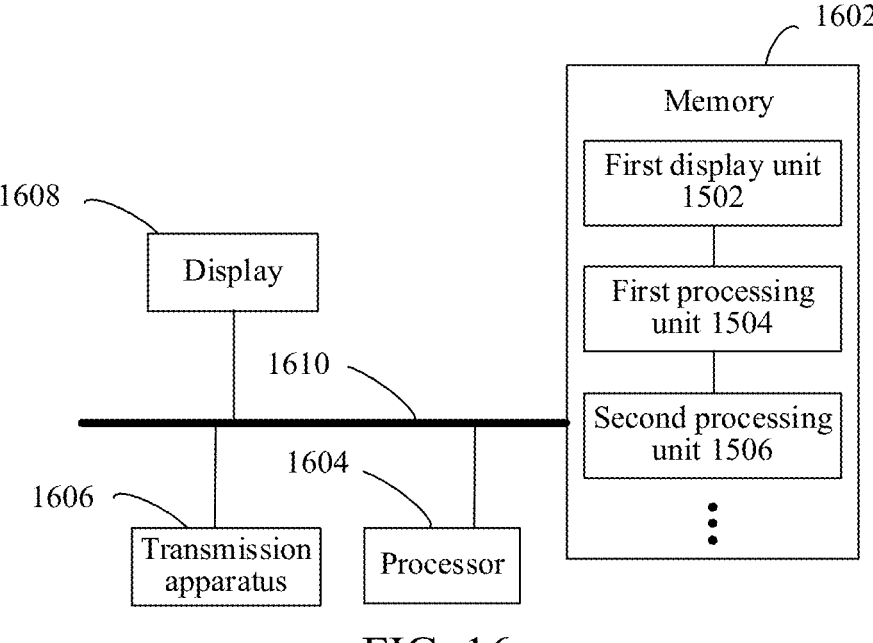
FIG. 16 is an example schematic structural diagram of an electronic device according to an aspect of the present disclosure.

According to still another aspect of this disclosure, an electronic device configured to implement the foregoing target operation batch execution method is further provided, where the electronic device may be a terminal device shown in FIG. 16. In this example, an example in which the electronic device is a background device is used for description. As shown in FIG. 16, the electronic device includes a memory 1602 and a processor 1604, the memory 1602 having a computer program stored therein, and processing circuitry, such as the processor 1604 being configured to perform the operations in any one of the foregoing method examples by using the computer program.

In this example, the electronic device may be located in at least one of a plurality of network devices in a computer network.

In this example, the processor may be configured to perform the following operations by using the computer program:

S1: Display a game picture of a target virtual character, a group of virtual objects being included in a game scene in which the target virtual character is located, and each virtual object in the group of virtual objects allowing the target virtual character to perform a same target operation on the virtual object.

S2: Display a batch execution button when the target operation is performed by the target virtual character on a part of virtual objects respectively in the group of virtual objects and a quantity of the part of virtual objects is greater than or equal to a preset quantity threshold, the batch execution button being configured for performing the target operation in batches on remaining virtual objects other than the part of virtual objects in the group of virtual objects.

S3: Perform, in response to a trigger operation on the batch execution button, the target operation in batches on the remaining virtual objects in the group of virtual objects.

In an example, a person of ordinary skill in the art may understand that, the structure shown in FIG. 16 is only illustrative. The electronic device may also be a target terminal such as a smartphone (such as an Android mobile phone or an iOS mobile phone), a tablet computer, a palmtop computer, a mobile Internet device (MID), or a PAD. FIG. 16 docs not constitute a limitation on a structure of the foregoing electronic device. For example, the electronic device may further include more or fewer components (for example, a network interface) than those shown in FIG. 16, or has a configuration different from that shown in FIG. 16.

The memory 1602 may be configured to store software programs and modules, for example, program instructions/modules corresponding to a target operation batch execution method and apparatus in the disclosure, and the processor 1604 performs various functional applications and data processing by running the software programs and the modules stored in the memory 1602, to implement the foregoing target operation batch execution method. The memory 1602 may include a high-speed random memory, and may also include a non-volatile memory, for example, one or more magnetic storage apparatuses, a flash memory, or another non-volatile solid-state memory. In an example, the memory 1602 may further include memories remotely disposed relative to the processor 1604, and the remote memories may be connected to a terminal through a network. Examples of the network include, but are not limited to, the Internet, an intranet, a local area network, a mobile communication network, and a combination thereof. The memory 1602 may be further configured to store the preset quantity threshold, the game picture, and the like, but is not limited thereto. In an example, as shown in FIG. 16, the memory 1602 may include, but is not limited to, the first display unit 1502, the first processing unit 1504, and the second processing unit 1506 in the foregoing target operation batch execution apparatus. In addition, the memory 1602 may further include, but is not limited to, another module unit in the foregoing target operation batch execution apparatus. This is not described again in this example.

In an example, a transmission apparatus 1606 is configured to receive or transmit data by using a network. Specific examples of the foregoing network include a wired network and a wireless network. In an example, the transmission apparatus 1606 includes a network interface controller (NIC). The NIC may be connected to another network device and a router by using a network cable, to communicate with the Internet or a local area network. In an example, the transmission apparatus 1606 is a radio frequency (RF) module, to communicate with the Internet in a wireless manner.

In addition, the electronic device further includes: a display 1608, configured to display orientation prompt information of a target sound; and a connection bus 1610, to connect to each module component in the electronic device.

In other examples, the target terminal or a server may be a node in a distributed system, where the distributed system may be a blockchain system, and the blockchain system may be a distributed system formed by connecting a plurality of nodes in a form of network communication. A peer-to-peer (P2P) network may be formed between the nodes, and any form of computing device, such as a server or a terminal, may be used as a node in the blockchain system by adding the peer-to-peer network.

According to one aspect of this disclosure, a computer program product or a computer program is provided, including computer instructions, where the computer instructions are stored in a computer-readable storage medium. A processor of a computer device reads the computer instructions from the computer-readable storage medium, and the computer instructions, when executed by the processor, enable the computer device to perform the target operation batch execution method provided in various implementations such as server verification processing, where the computer program, when run, is configured to perform the operations in any one of the foregoing method examples.

In this example, the computer-readable storage medium may be configured to store a computer program configured to perform the following operations:

S1: Display a game picture of a target virtual character, a group of virtual objects being included in a game scene in which the target virtual character is located, and each virtual object in the group of virtual objects allowing the target virtual character to perform a same target operation on the virtual object.

S2: Display a batch execution button when the target operation is performed by the target virtual character on a part of virtual objects respectively in the group of virtual objects and a quantity of the part of virtual objects is greater than or equal to a preset quantity threshold, the batch execution button being configured for performing the target operation in batches on remaining virtual objects other than the part of virtual objects in the group of virtual objects.

S3: Perform, in response to a trigger operation on the batch execution button, the target operation in batches on the remaining virtual objects in the group of virtual objects.

In this example, a person of ordinary skill in the art may understand that all or some of the operations of the methods in the foregoing examples may be implemented by a program instructing relevant hardware of the terminal device. The program may be stored in the non-transitory computer-readable storage medium. The storage medium may include a flash disk, a read-only memory (ROM), a random access memory (RAM), a magnetic disk, an optical disc, and the like.

The sequence numbers of the foregoing examples of this application are merely for description purpose but do not imply the preference among the examples.

When the integrated unit in the foregoing examples is implemented in a form of a software functional unit and sold or used as an independent product, the integrated unit may be stored in the foregoing computer-readable storage medium. Based on such an understanding, the technical solutions of the present disclosure essentially, or the part contributing to the related art, or all or some of the technical solutions may be presented in the form of a software product. The computer software product is stored in the storage medium, and includes a plurality of instructions for instructing one or more computer devices (which may be a personal computer, a server, a network device, or the like) to perform all or some of the operations of the methods described in the examples of the present disclosure.

One or more modules, submodules, and/or units of the apparatus can be implemented by processing circuitry, software, or a combination thereof, for example. The term module (and other similar terms such as unit, submodule, etc.) in this disclosure may refer to a software module, a hardware module, or a combination thereof. A software module (e.g., computer program) may be developed using a computer programming language and stored in memory or non-transitory computer-readable medium. The software module stored in the memory or medium is executable by a processor to thereby cause the processor to perform the operations of the module. A hardware module may be implemented using processing circuitry, including at least one processor and/or memory. Each hardware module can be implemented using one or more processors (or processors and memory). Likewise, a processor (or processors and memory) can be used to implement one or more hardware modules. Moreover, each module can be part of an overall module that includes the functionalities of the module. Modules can be combined, integrated, separated, and/or duplicated to support various applications. Also, a function being performed at a particular module can be performed at one or more other modules and/or by one or more other devices instead of or in addition to the function performed at the particular module. Further, modules can be implemented across multiple devices and/or other components local or remote to one another. Additionally, modules can be moved from one device and added to another device, and/or can be included in both devices.

In the foregoing disclosure, the descriptions of the examples have different focuses. For a part that is not detailed in an example, refer to the relevant description of other examples.

In a plurality of examples provided in this application, the disclosed client may be implemented in another manner. The foregoing described apparatus examples are merely examples. For example, unit division is merely logical function division, and there may be other division manners in actual implementations. For example, a plurality of units or components may be combined or integrated into another system, or some features may be omitted or not performed. In addition, the coupling, or direct coupling, or communication connection between the displayed or discussed components may be the indirect coupling or communication connection through some interfaces, units, or modules, and may be electrical or of other forms.

Units described as separate parts may or may not be physically separate, and components displayed as units may or may not be physical units, that is, may be located in one position, or may be distributed on a plurality of network units. Some or all of the units may be selected according to actual needs to achieve the objectives of the solutions of the examples.

In addition, functional units in the examples of the present disclosure may be integrated into one processing unit, or each of the units may be physically separated, or two or more units may be integrated into one unit. The integrated unit may be implemented in the form of hardware, or may be implemented in a form of a software functional unit.

The foregoing descriptions are merely examples of implementations of the present disclosure, and a person of ordinary skill in the art may make various improvements and modifications without departing from the spirit of the present disclosure. All such improvements and refinements shall fall within the protection scope of the present disclosure.

What is claimed is:

1. A target operation batch execution method, comprising:
displaying a target virtual character in a game scene, the game scene including a group of virtual objects, and each virtual object in the group of virtual objects being available for the target virtual character to perform a target operation;
displaying a batch option when the target operation is selected by the target virtual character for a subset of the group of virtual objects and a number of the subset of the virtual objects is greater than or equal to a preset threshold; and
performing, based on a trigger operation on the batch option, a batch target operation, the batch option being configured to perform the batch target operation on the group of virtual objects.

2. The method according to claim 1, further comprising:
displaying the batch option based on a selection operation on one of remaining virtual objects in the group of virtual objects.

3. The method according to claim 2, further comprising:
displaying a selected mark of each of the remaining virtual objects based on the remaining virtual objects being selected.

4. The method according to claim 1, further comprising:
displaying the batch option when the target operation is selected by the target virtual character on the subset of the group of virtual objects, the target operation performed on each of the subset of virtual objects being a continuously performed operation.

5. The method according to claim 1, further comprising:
sticking, when the target operation is configured to stick a virtual article on a virtual object of the group of virtual objects, the virtual article based on the trigger operation on the batch option.

6. The method according of claim 5, further comprising:
sticking, when a target virtual article in a virtual article set is selected, the target virtual article based on the trigger operation on the batch option, wherein the virtual article set comprises a group of virtual articles allowed to be stuck on the virtual objects; or
randomly selecting, when none of the virtual articles is selected by a user, one or more virtual articles from the virtual article set based on the trigger operation on the batch option, and sticking the randomly selected one or more virtual articles, wherein the virtual article stuck on the virtual objects is one of the randomly selected one or more virtual articles.

7. The method according to claim 1, further comprising:
removing, when the target operation is configured to remove a virtual article, virtual articles stuck on the virtual objects based on the trigger operation on the batch option.

8. The method according to claim 1, further comprising:
moving, when the target operation is configured to move the virtual objects in a target area, all of the virtual objects in the target area based on the trigger operation on the batch option; or
moving, when the target operation is configured to move the virtual objects in a target virtual container, all of the virtual objects in the target virtual container based on the trigger operation on the batch option.

9. The method according to claim 1, further comprising:
performing the target operation on remaining virtual objects when a first virtual object set and a second virtual object set are included in the game scene, an object type of each virtual object in the first virtual object set is a first type, an object type of each virtual object in the second virtual object set is a second type which is different from the first type.

10. The method according to claim 9, further comprising:
displaying an extended option after the target operation is performed; and
performing, based on a trigger operation on the extended option, the target operation of the extended option on the virtual objects.

11. A target operation batch execution apparatus, comprising:
processing circuitry configured to:
  display a target virtual character in a game scene, the game scene including a group of virtual objects, and each virtual object in the group of virtual objects being available for the target virtual character to perform a target operation;
  display a batch option when the target operation is selected by the target virtual character for a subset of the group of virtual objects and a number of the subset of the virtual objects is greater than or equal to a preset threshold; and
  perform a batch target operation based on a trigger operation on the batch option, the batch option being configured to perform the batch target operation on the group of virtual objects.

12. The apparatus according to claim 11, wherein the processing circuitry is further configured to:
  display the batch option based on a selection operation on one of remaining virtual objects in the group of virtual objects.

13. The apparatus according to claim 12, wherein the processing circuitry is further configured to:
  display a selected mark of each of the remaining virtual objects based on the remaining virtual objects being selected.

14. The apparatus according to claim 11, wherein the processing circuitry is further configured to:
  display the batch option when the target operation is selected by the target virtual character on the subset of the group of virtual objects, the target operation performed on each of the subset of virtual objects being a continuously performed operation.

15. The apparatus according to claim 11, wherein the processing circuitry is further configured to:
  stick a virtual article on a virtual object of the group of virtual objects based on the trigger operation on the batch option, wherein the target operation is configured to stick the virtual article on the virtual object.

16. A non-transitory computer-readable storage medium, storing instructions which when executed by a processor cause the processor to perform:
displaying a target virtual character in a game scene, the game scene including a group of virtual objects, and each virtual object in the group of virtual objects being available for the target virtual character to perform a target operation;
displaying a batch option when the target operation is selected by the target virtual character for a subset of the group of virtual objects and a number of the subset of the virtual objects is greater than or equal to a preset threshold; and
performing a batch target operation based on a trigger operation on the batch option, the batch option being configured to perform the batch target operation on the group of virtual objects.

17. The non-transitory computer-readable storage medium according to claim 16, wherein the instructions further cause the processor to perform:
displaying the batch option based on a selection operation on one of remaining virtual objects in the group of virtual objects.

18. The non-transitory computer-readable storage medium according to claim 17, wherein the instructions further cause the processor to perform:
displaying a selected mark of each of the remaining virtual objects based on the remaining virtual objects being selected.

19. The non-transitory computer-readable storage medium according to claim 16, wherein the instructions further cause the processor to perform:
displaying the batch option when the target operation is selected by the target virtual character on the subset of the group of virtual objects, the target operation performed on each of the subset of virtual objects being a continuously performed operation.

20. The non-transitory computer-readable storage medium according to claim 16, wherein the instructions further cause the processor to perform:
stick a virtual article on a virtual object of the group of virtual objects based on the trigger operation on the batch option, wherein the target operation is configured to stick the virtual article on the virtual object.

* * * * *